United States Patent
Ackermann et al.

(10) Patent No.: US 12,254,995 B2
(45) Date of Patent: Mar. 18, 2025

(54) METHOD FOR PROVIDING A NEUTRON RADIATION SHIELD, AND ACCORDING SHIELDING SYSTEM

(71) Applicant: FRAMATOME GmbH, Erlangen (DE)

(72) Inventors: Lars Ackermann, Erlangen (DE); Ralf Buckermann, Erlangen (DE); Stefan Skandera, Erlangen (DE)

(73) Assignee: FRAMATOME GmbH, Erlangen (DE)

( * ) Notice: Subject to any disclaimer, the term of this patent is extended or adjusted under 35 U.S.C. 154(b) by 517 days.

(21) Appl. No.: 17/770,854

(22) PCT Filed: Oct. 22, 2019

(86) PCT No.: PCT/EP2019/078773
§ 371 (c)(1),
(2) Date: Apr. 21, 2022

(87) PCT Pub. No.: WO2021/078370
PCT Pub. Date: Apr. 29, 2021

(65) Prior Publication Data
US 2022/0367074 A1    Nov. 17, 2022

(51) Int. Cl.
| | | |
|---|---|---|
| G21C 11/02 | (2006.01) | |
| G21C 17/116 | (2006.01) | |
| G21F 3/00 | (2006.01) | |
| G21F 7/005 | (2006.01) | |
| H02G 3/22 | (2006.01) | |

(52) U.S. Cl.
CPC .......... *G21C 11/026* (2013.01); *G21C 17/116* (2013.01); *G21F 3/00* (2013.01); *G21F 7/005* (2013.01); *H02G 3/22* (2013.01)

(58) Field of Classification Search
CPC .... G21C 17/108; G21C 17/116; G21C 11/02; G21C 11/026; G21F 3/00
See application file for complete search history.

(56) References Cited

U.S. PATENT DOCUMENTS

| | | | | |
|---|---|---|---|---|
| 4,261,794 A | * | 4/1981 | Yue | G21C 17/116 976/DIG. 240 |
| 2001/0053817 A1 | * | 12/2001 | Anayama | G21F 1/10 525/107 |
| 2013/0334444 A1 | * | 12/2013 | Shimazu | G21C 17/108 250/515.1 |

FOREIGN PATENT DOCUMENTS

| | | |
|---|---|---|
| EP | 2355108 A1 | 8/2011 |
| GB | 868 524 A | 5/1961 |
| GB | 925 505 A | 5/1963 |

OTHER PUBLICATIONS

Corresponding Search Report and Written Opinion for PCT/EP2019/078773.

* cited by examiner

*Primary Examiner* — David E Smith
*Assistant Examiner* — Hsien C Tsai
(74) *Attorney, Agent, or Firm* — Davidson Kappel LLC

(57) ABSTRACT

A method for providing a neutron radiation shield includes a step (a) of providing a wall having an opening; and a step (b) of at least partially filling a space in the opening with a neutron moderator. Step (b) includes blast-injecting plastic granules into the opening with a blower device to form the neutron moderator.

14 Claims, 2 Drawing Sheets

METHOD FOR PROVIDING A NEUTRON RADIATION SHIELD, AND ACCORDING SHIELDING SYSTEM

The present disclosure relates to a method for providing a neutron radiation shield and to an according neutron radiation shield, in particular for a wall penetration.

BACKGROUND

Facilities in which neutron radiation emerges or occurs, like nuclear power plants, research facilities or medical facilities, usually comprise walls in which openings are provided in order to lead through pipes or cables or other objects. The remaining space in the openings must be reliably closed by a neutron radiation shielding or plug. In some cases, other types of radiation shall be shielded as well. The shielding effect of the penetrated wall shall be no worse than that of the untouched original wall or the given radiation protection (RP) requirements.

The respective opening and/or penetrating object can have an irregular geometry or cross section and may be difficult to access. In some cases, it may also be desired to allow for a later removal of the plug and for an inspection of the penetrating object.

GB 868 524 A discloses a slab of polyethylene having lead or tungsten uniformly dispensed therein. The slabs are used to provide a shielding against radiation.

Using prefabricated slabs (inserts) may have disadvantages if the openings to be plugged have an irregular geometry and/or are difficult to access. It requires careful and accurate measuring of the installation location, precise fabrication of the slabs according to the previous measurements, and careful handling of the breakable slabs during installation.

GB 925 505 A describes the use of polyethylene particles having a spherical shape for neutron attenuation. It also relates to manufacturing radiation shields made from polyethylene. In particular, particles of various sizes may be embedded in an organic binder to provide some sort of organic concrete having neutron shielding properties.

SUMMARY

Fabrication and pouring of the resulting organic concrete may be intricate and costly. Besides that, the curing process may take a long time. In the case of a wall penetration it may also be difficult to remove the thus-fabricated plug for later inspections.

It is as objective of the present disclosure to disclose a method for providing a neutron radiation shield which overcomes the disadvantages related to the prior art. The according neutron radiation shield shall be easy to establish in little time, and the method shall be flexible to adapt to various installation locations. Furthermore, it shall preferably be possible to remove the radiation shield for later inspection tasks.

Therefore, the present disclosure provides a method for providing a neutron radiation shield, the method comprising the following steps:
(a) providing a wall having an opening;
(b) at least partially filling a space in the opening with a neutron moderator;
wherein step (b) comprises:
blast-injecting plastic granules into the opening with a blower device to form the neutron moderator.

In general, the present disclosure is based on the insight that effective neutron radiation shielding uses a neutron moderator in order to slow down (thermalize) fast neutrons such as to achieve higher absorption or shielding rates in an associated neutron absorber. Usually, this is a two-stage process which is achieved by a combination of a dedicated neutron moderator material and a dedicated neutron absorber material arranged in some neighborhood or adjacent to each other. Especially if the neutron absorber is also to absorb other kinds of radiation, the more general term 'radiation absorber' might be more appropriate. However, to some extent the neutron moderator material may also be capable of absorbing neutrons and/or other kinds of radiation. In this case, the goal might be reached by a single shielding material. In other words, the term 'neutron moderator' includes the possibility that the same material also acts as a radiation absorber, in particular as a neutron absorber.

The above specified concept is particularly useful for plugging cable or pipe penetrations or channels and vents. Due to the blow concept of the installation method it is applicable for any penetration shape and can be adapted to any routing inside without nameable effort.

In particular, the granules in the resulting neutron moderator section are not bound by any binder or embedded in a binding material like concrete and can thus be removed with acceptable efforts, if necessary, at some later time. The arrangement facilitates the provision of the radiation shield, as a pre-manufacturing of a slab in accordance with the exact geometric dimensions of the opening is not necessary.

Expedient embodiments and advancements of the basic idea are given in the subsequent detailed description.

In a preferred embodiment, the plastic granules are made of or are based on polyethylene which is available on an industrial scale at relatively lost costs and is able to moderate neutrons quite well. To some extent polyethylene also acts as a neutron absorber. This includes the possibly that a fraction of the granules comprises or consists of non-polyethylene or even non-plastic material. In other words, in a preferred embodiment the granules are exclusively made of polyethylene, but in other variants there may be admixtures or additions of other granules. In yet other variants polyethylene may be substituted by some other suitable plastic material or even non-plastic material.

Preferably, the plastic granules have a diameter which is smaller than 5 mm.

Preferably, the method according to the present disclosure comprises the step of compressing a bulk of the plastic granules by applying vibrations, such that any voids are closed by the granules and some kind of densest packing is approximated. Alternatively, or additionally, the method may also comprise the step of plugging and/or introduction by packages.

Expediently, the vibrations are applied by a mobile vibration lance.

Preferably, cycles of blast-injections and vibrations are applied in an alternating manner until the neutron moderator formed by the plastic granules has a mean density of at least 0.5 g/cm$^3$.

In a preferred embodiment, the method according to the present disclosure comprises the step of at least partially filling a space in the opening adjacent to the neutron moderator with a radiation absorber.

The radiation absorber preferably comprises mineral wool and/or lead wool, preferably provided as compressed boards or discs. Mineral wool primarily acts as a neutron absorber, while lead wool is a good gamma absorber. Alternatively, or additionally, other absorbers such as tungsten or soft irons, mortar etc. may be used.

In a preferred variant the opening is lined with a sleeve which encloses the neutron moderator and, if applicable, a radiation absorber. The ends of the sleeve may protrude from the wall in order to close them by caps or similar closures.

The present disclosure also is about the use of a bulk filling of plastic granules which are not bound by any binder for providing a neutron radiation shield in an opening of a wall.

Furthermore, the present disclosure relates to a wall comprising an opening that is provided with a radiation shield realized by the method specified above.

In a preferred application scenario, the opening forms a lead-though for a cable and/or a pipe.

Preferably, the neutron moderator is arranged in a sandwich-like configuration between two radiation absorber sections, wherein the neutron moderator extends along roughly ⅔ of the wall thickness. The remaining ⅓ of the wall thickness is provided for the radiation absorber material. Alternatively, the radiation shield is realized without any further absorber besides the neutron moderator material, i.e. there is a non-sandwich configuration.

BRIEF SUMMARY OF THE DRAWINGS

Exemplary embodiments of the present disclosure with according advantages are now described in connection with the accompanying drawings.

DETAILED DESCRIPTION

Figure 1:
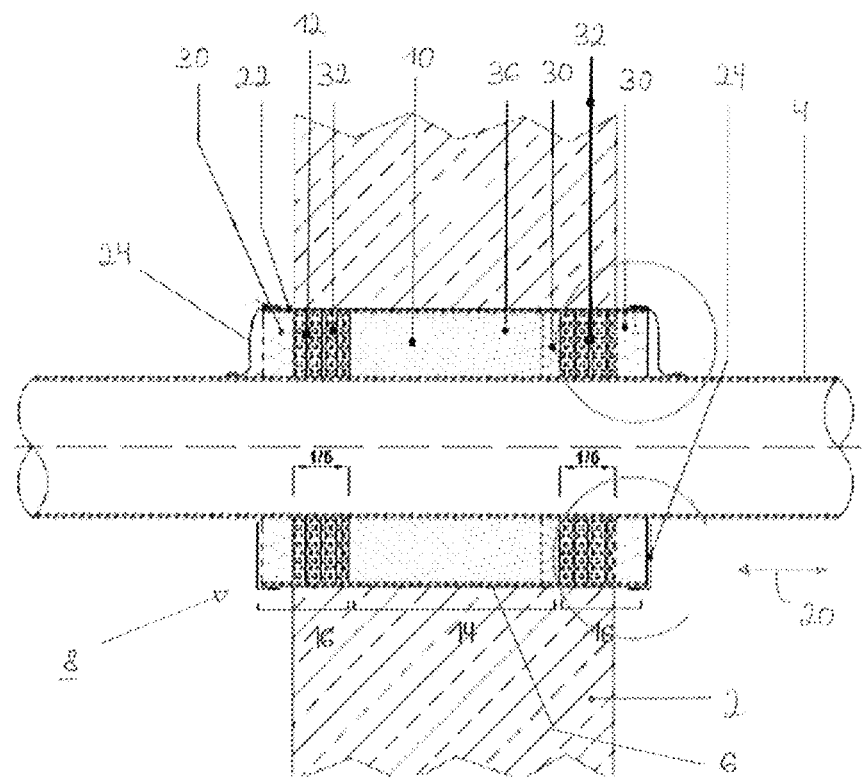
FIG. 1 shows a sectional view of a first variant of a radiation shielding or plug for a wall/floor/ceiling (generally: structure) penetration.

Similar elements are designated the same reference numerals throughout the drawings.

FIG. 1 shows a sectional view of a wall 2 inside a nuclear facility, a research facility, an accelerator, or medical facility, in particular a nuclear power plant. The shown wall section may be part of a larger wall structure. On one side of the wall 2 there may be a neutron source and/or a gamma source, and in this case the wall 2, which for example may be a concrete wall or reinforced concrete wall or metal wall, provides effective radiation shielding with respect to the emerging neutron radiation and/or gamma radiation. In order to lead a pipe 4 for a fluid medium through the wall 2, there is an opening 6 or hole or cavity reaching through the wall 2, for example a cylindrical borehole. The diameter of the opening 6 is larger than the diameter of the pipe 4. In the example, the pipe 4 is arranged concentrically to the cylindrical opening 6. Basically, the remaining annular space between the pipe 4 and the wall 2 (apart from a sleeve 22 which might be present, see below) is filled by a radiation shielding plug 8 in order to maintain the radiation shielding effect of the wall 2 in the region of the opening 6 with the pipe lead-through.

In particular, the plug 8 comprises an inner section which is at least partly and preferably completely filled with a material which mainly acts as a neutron moderator 10. The plug 8 further comprises two outer sections which are at least partly and preferably totally filled with a material which mainly acts as a radiation absorber 12 with respect to gamma and/or neutron radiation. Hence, there is a sandwich configuration with a neutron moderator section 14 or zone in the middle and two adjacent radiation absorber sections 16 or zones, in particular neutron absorber sections or zones, enclosing the middle part, as viewed in longitudinal direction 20. The purpose of the neutron moderator section 14 is to slow down (thermalize) neutrons such as to increase the absorption rate in the adjacent radiation absorber sections 16.

As indicated in FIG. 1, the length of the neutron moderator section 14 in longitudinal direction 20 is preferably roughly ⅔ of the wall thickness, and the length of each radiation absorber section 16 is preferably roughly ⅙ of the wall thickness. The neutron moderator section 14 preferably lies completely within the wall 2. The neutron moderator 10 and the radiation absorber 12 are preferably circumferentially enclosed by a cylindrical sleeve 22, for example made of plastic or metal or carbon or acrylic glass, which lies against the wall 2 without any gaps. In other words, the sleeve 22 fits tightly against the confining boundary of the opening 6, preferably realizing a force-fit connection. On both ends the sleeve 22 may protrude a bit from the wall 2 in longitudinal direction 20. Each end is preferably closed by a closure 24. This is preferably a cap-like closure which for example may be a rubber or steel membrane or a plastic or steel cap. The closure 24 preferably sits firmly/tightly on the protruding part of the sleeve 22 and is fixed by a closure fixation, for example made of contraction steel straps.

The radiation absorber or shielding material may consist of mineral wool and/or lead wool and/or tungsten and/or soft irons and/or mortar or may comprise these materials as main ingredients. While mineral wool alone may be sufficient for neutron absorption, lead wool is advantageous for gammy ray absorption. For example, as indicated in FIG. 1, there may be an outer section of mineral wool 30 and an inner section of lead wool 32 on each end of the plug 8 (so-called 'lost formworks'). The mineral wool section may comprise subsections with different sorts of mineral wool having different physical properties. Analogously, there may be subsections with different sorts of lead wool. In alternative embodiments the order of the mineral wool section and the lead wool section may be different, or either of them may be missing, or there may be additional sections. The lead wool 32, if present, is preferably provided as a compressed lead wool board or disk, preferably with a density≥5 g/cm³. Similarly, the mineral wool 30, if present, is preferably provided as a compressed mineral wool board or disk.

According to the present disclosure, the neutron moderator 10 in the middle part of the plug 8 comprises and preferably (exclusively) consists of a bulk filling of (raw) plastic granules 36, such as, for example, polyethylene (PE) granules with a grain size of preferably ≤5 mm. Instead of PE granules, other materials with neutron moderating and/or shielding properties may be used. Typically, these are materials with a large number of bound hydrogen atoms, like in many plastic materials. For example, granules made of polyether-ether-ketone (PEEK) may be used to provide a very high temperature resistance. Mixtures of granules made of different materials and/or of granules with different physical and/or chemical properties may also be used. As described further below, the technical process of blast-injecting, preferably in combination with applying vibrations during assembly of the plug 8, may be used to provide a compressed bulk filling with a sufficient high density of preferably ≥0.5 g/cm³.

As explained in the introductory part, the prior art suggests to either use plastic plates extruded (i.e. melt-cast) from plastic granules as filling material or to directly cast plastic melt made of molten plastic granules into the cavity or opening. In contrast to this, the present disclosure suggests using the raw, non-molten plastic granules (i.e. the intermediate goods) themselves as a loose bulk filling material which is then compressed to reach a minimum density required for effective neutron moderation (and, in turn, for effective absorption in the adjacent neutron absorbers). Hence, according to the present disclosure, melting of the plastic granules can be avoided, and in general using any sort of binder is avoided.

Since PE is considered a flammable material, in this case in order to achieve fire protection for the wall penetration, the use of fire-resistant insulation material at the outer borders of the penetration is mandatory. This is achieved, for example, by the above-described mineral wool boards, with a thickness of preferably at least 60 mm each in longitudinal direction 20, in the radiation absorber sections 16. Hence, the suggested mineral wool 30 serves a dual purpose as radiation absorber and flame barrier. The expected fire performance of such an arrangement has been confirmed in experimental tests.

Figure 2:
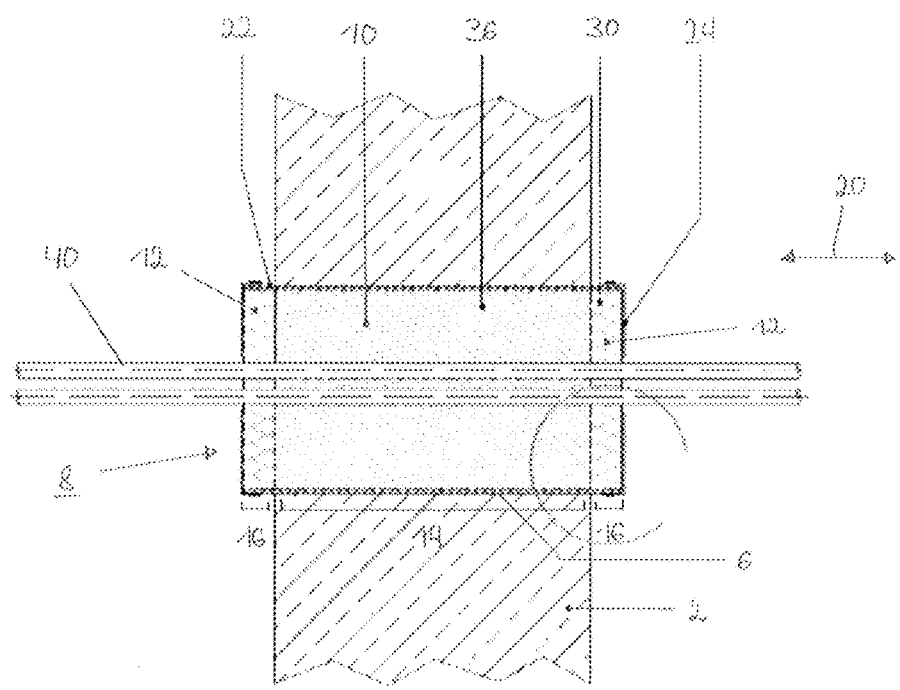
FIG. 2 shows an according view of a second variant of a radiation shielding or plug for a wall/floor/ceiling (generally: structure) penetration.

FIG. 2 shows a sectional view of a second embodiment of a radiation shielding plug 8 for a wall lead-though or wall penetration. Instead of a pipe penetration, there is a cable penetration. In the example shown, there are two separate cables 40 or wires aligned parallel to each other and to the longitudinal direction 20 in a central region of the wall opening 6. Like in the previous example the opening 6 is lined with a sleeve 22 which on both ends protrudes above the wall plane. In a middle part which in this case longitudinally extends over the entire wall thickness, the sleeve 22 encloses a bulk filling with a neutron moderator 10 of the kind described in connection with FIG. 1. In the outer protruding regions, the sleeve 22 encloses, in each case, a board of mineral wool 30, also of the kind described in connection with the previous example. Again, there are closures 24, for example stainless steel caps fixed on both ends of the sleeve 22.

During assembly of the shielding plug 8, an opening 6 in a wall 2 is provided. A sleeve 22 is inserted into the opening 6 and fixed therein to provide a lining of the opening 6. Then, a cable 40 and/or pipe 4 and/or any other penetrating object is lead through the opening 6 and arranged within the sleeve 22, preferably in a central region. Afterwards, in the neutron moderator section 14 the remaining space between the penetrating object and the sleeve 22 is filled with a neutron moderator 10, preferably made of raw plastic granules 36 of the kind describe above. For this purpose, a temporary closure may be fixed at one end of the neutron moderator section 14, and the granules 36 are inserted through the opening at the other end. Alternatively, there may be temporary closures or plugs at both ends of the region to be filled, wherein one of the temporary closures or plugs comprises a small opening for insertion of an injection lance or hose connected to a blast-injection or blower device (see below).

Figure 3:
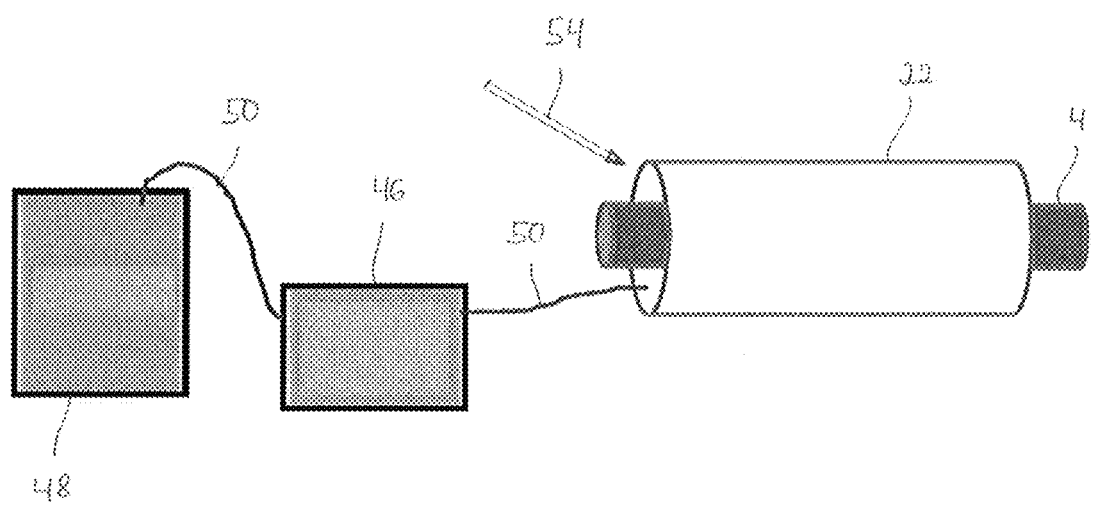
FIG. 3 shows a schematic illustration of a process step during installation of a radiation shielding according to FIG. 1 or 2.

This process step is visualized in FIG. 3. A blower device 46 with according flexible hoses is used to draw in or suck plastic granules 36 from a reservoir 48, for example a bag or sack, and to blow or blast-inject them into the desired section within the opening 6 or sleeve 22. The blower device 46 can be a conventional blower device which is commonly used for injecting heat insulation granules during house construction. In an example embodiment, the blower device 46 which is also known as a blast-injection machine is equipped with a compressor which generates an overpressure of 400 mbar. Thus, the machine allows the transportation of the granule through a flexible hose 50 of up to 180 m length. The injection of the granules 36 into the target region may happen through a steel-made injection lance.

Preferably, a feed rate indicating the fed mass per time unit (for example kg/min) and/or the total fed mass (for example in kg) of plastic granules 36 are measured during the injection process. Hence, in connection with the known volume of the filling region, an estimate of the reached filling density can be calculated in an according control unit. A pressure drop measured in the blast-injection machine or in the associated hoses or line sections may provide alternative or additional means for verifying if given target density criteria are met.

In order to compact or compress the bulk filling, vibrations may be applied with a vibration device, in particular a vibration lance which is inserted into the bulk filling. In FIG. 3 a vibration lance 54 is schematically indicated. This application of vibrations may be done continuously during blast-injection or periodically or from time to time when the blast-injection is halted or paused. For example, a first round of blast-injection is done until an initial target value for the filling density is reached, then the injection is paused, and vibrations are applied to compress the bulk filling. Afterwards, a second round of blast-injection is done to fill the remaining space. The process may be repeated until a final target value of preferably ≥0.5 g/cm³ is reached and/or residual voids in the bulk filling have been closed.

Afterwards, the temporary closure is removed and mineral wool boards and/or lead wool boards or any other suitable absorber materials are arranged in the radiation absorber sections 16 adjacent to the neutron moderator section 14. Finally, closures 24 are arranged and fixed at both ends of the sleeve 22.

While it is convenient and advantageous to have a sleeve 22 as described above, the core of the present disclosure can in principle also be practiced without a sleeve 22. In this case, the filling materials are directly inserted into the wall opening 6, and any suitable closure 24 can be used, for example a closured attached to the wall 2 or clamped into the opening 6.

Within this description the term 'wall' is to be understood in a broad sense and may also comprise partition walls, bottom slabs, base plates, ceiling panels or roof slabs of any sort of building, installation or construction. It also comprise door and window leaves and similar objects. Preferably, the term 'wall' comprises a wall between a room containing a radiation source, in particular a neutron source, and a room or a component to be shielded against the radiation from this source. Preferably, this may a wall in a nuclear power plant or reactor building, a nuclear research facility, or a medical research facility, for example a radiation therapy center with a particle accelerator and/or any other radiation source.

In the case of a nuclear power plant, the here-described wall penetrations are designed to resist the pressure surge in case of a loss-of-coolant accident (LOCA) with respect to the solid filling and finishing of the penetration. The functionality was proven in the course of containment leakage tests.

In general, any number or cables 40, wires and/or pipes 4 can be routed through the opening 6. These objects can be enclosed by a support tube or the like to provide space for lateral movement. In this case, the remaining space between the support tube and the sleeve 22 or opening boundary is to be filled by the neutron moderator 10 and/or the radiation absorber 12. The alignment of the penetrating objects does not need to be parallel to the longitudinal direction 20 of the sleeve 22 but can be slanted or skewed instead. In general, the wall opening 6 does not need to be cylindrical or straight-lined but can have curves, bends and/or kinks with according edges. The concept of blast-injection will work in any of these cases.

Furthermore, instead of blast-injecting with a blower device, alternative or additional methods of injection may be used to introduce or inject the plastic granules into the according opening or cavity, for example shoveling, conveying, pouring, dumping, and/or tipping.

Finally, while the present disclosure has been mainly described in a nuclear context to provide efficient plugging of a wall opening against neutrons, the disclosed structure and the process of blast-injecting granules can also be used in other contexts to provide efficient plugs for wall openings or lead-throughs. In such a context, instead of plastic granules any suitable granules can be applied. The concept of the present disclosure can be applied to new builds and retrofitted to existing objects as well.

LIST OF REFERENCE NUMERALS 2 wall
4 pipe
6 opening
8 plug
10 neutron moderator
12 radiation absorber
14 neutron moderator section
16 radiation absorber section
20 longitudinal direction
22 sleeve
24 closure
30 mineral wool
32 lead wool
36 plastic granules
40 cable
46 blower device
48 reservoir
50 hose
54 vibration lance

What is claimed is:

1. A method for providing a neutron radiation shield comprising:
   providing a wall having an opening; and
   at least partially filling a space in the opening with a neutron moderator by blast-injecting plastic granules into the opening with a blower device to form the neutron moderator.

2. The method according to claim 1, wherein the plastic granules are made of or are based on polyethylene and/or PEEK.

3. The method according to claim 1, wherein the plastic granules have a diameter smaller than 5 mm.

4. The method according to claim 1, further comprising compressing a bulk of the plastic granules by applying vibrations, and/or plugging and/or introduction by packages.

5. The method according to claim 4, wherein vibrations are applied by a vibration lance.

6. The method according to claim 1, wherein the neutron moderator formed by the plastic granules has a mean density of a least 0.5 g/cm$^3$.

7. The method according to claim 1, further comprising at least partially filling a space in the opening adjacent to the neutron moderator with a radiation absorber.

8. The method according to claim 7, wherein the radiation absorber comprises mineral wool and/or lead wool.

9. The method according to claim 1, wherein the opening is lined with a sleeve which encloses the neutron moderator.

10. A method of using a bulk filling of plastic granules not bound by any binder comprising:
    providing the plastic granules in an opening of a wall to form a neutron radiation shield.

11. A wall comprising an opening that is provided with a radiation shield realized by the method of claim 1.

12. The wall according to claim 11, wherein the opening forms a channel or a lead-though for a pipe and/or a cable.

13. The wall according to claim 11, wherein the neutron moderator is arranged in a sandwich configuration between two radiation absorber sections.

14. The wall according to claim 13, wherein the neutron moderator extends along roughly ⅔ of a thickness of the wall.

* * * * *